(12) United States Patent
Bordes et al.

(10) Patent No.: US 12,464,121 B2
(45) Date of Patent: Nov. 4, 2025

(54) METHODS AND APPARATUSES FOR ENCODING/DECODING A VIDEO

(71) Applicant: InterDigital CE Patent Holdings, SAS, Paris (FR)

(72) Inventors: Philippe Bordes, Laille (FR); Franck Galpin, Thorigne-Fouillard (FR); Thierry Dumas, Rennes (FR); Karam Naser, Mouaze (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 42 days.

(21) Appl. No.: 18/572,299

(22) PCT Filed: Jun. 16, 2022

(86) PCT No.: PCT/EP2022/066450
§ 371 (c)(1),
(2) Date: Dec. 20, 2023

(87) PCT Pub. No.: WO2022/268627
PCT Pub. Date: Dec. 29, 2022

(65) Prior Publication Data
US 2024/0323367 A1   Sep. 26, 2024

(30) Foreign Application Priority Data

Jun. 24, 2021 (EP) ...................................... 21305869
Jun. 28, 2021 (EP) ...................................... 21305886
Jul. 8, 2021 (EP) ...................................... 21305939

(51) Int. Cl.
*H04N 19/117* (2014.01)
*H04N 19/186* (2014.01)
(Continued)

(52) U.S. Cl.
CPC ......... *H04N 19/117* (2014.11); *H04N 19/186* (2014.11); *H04N 19/30* (2014.11); *H04N 19/82* (2014.11)

(58) Field of Classification Search
CPC .. H04N 19/117; H04N 19/132; H04N 19/176; H04N 19/186; H04N 19/30;
(Continued)

(56) References Cited

U.S. PATENT DOCUMENTS

2002/0066007 A1 * 5/2002 Wise .................... G06F 12/0607
711/E12.003
2003/0156652 A1 * 8/2003 Wise ........................ G06F 13/16
711/E12.003
(Continued)

FOREIGN PATENT DOCUMENTS

WO   WO-2014138240 A1 * 9/2014 ............. H04N 19/17
WO   WO 2020228835 A1   11/2020
(Continued)

OTHER PUBLICATIONS

Hannuksela et al., "AHG9: On post-filter SEI", Joint Video Experts Team (JVET) of ITU-T SG 16 WP 3 and ISO/IEC JTC 1/SC 29, Document: JVET-V0058, 22nd JVET Meeting, by teleconference, Apr. 20, 2021, 4 pages.
(Continued)

*Primary Examiner* — Md N Haque
(74) *Attorney, Agent, or Firm* — Condo Roccia Koptiw LLP

(57) ABSTRACT

Methods and apparatuses for encoding/decoding a video are provided. A picture from a video is decoded from a bitstream, the picture being encoded in the bitstream at a resolution that is lower than an original resolution of the picture. Decoding the picture further comprises up-sampling the decoded picture to the original resolution, and applying
(Continued)

an adaptive filter to at least one component of the upsampled decoded picture. According to some embodiments, the adaptive filter may be performed in-loop or out-of-loop of the decoding/encoding process.

19 Claims, 14 Drawing Sheets

(51) Int. Cl.
    *H04N 19/30*     (2014.01)
    *H04N 19/82*     (2014.01)

(58) Field of Classification Search
    CPC ........ H04N 19/33; H04N 19/59; H04N 19/82; H04N 19/86
    See application file for complete search history.

(56) References Cited

U.S. PATENT DOCUMENTS

| | | | | |
|---|---|---|---|---|
| 2013/0136176 | A1* | 5/2013 | Chen | H04N 13/10 375/240.12 |
| 2017/0155905 | A1* | 6/2017 | Puri | H04N 19/129 |
| 2021/0176501 | A1* | 6/2021 | Chen | H04N 19/172 |

FOREIGN PATENT DOCUMENTS

| | | | |
|---|---|---|---|
| WO | WO 2020252745 | A1 | 12/2020 |
| WO | WO 2022180031 | A1 | 9/2022 |

OTHER PUBLICATIONS

Bordes et al., "ALF parameters for RPR", Joint Video Experts Team (JVET) of ITU-T SG 16 WP 3 and ISO/IEC JTC 1/SC 29, Document: JVET-W0073, 23rd Meeting, by teleconference, Jul. 7, 2021, 7 pages.

"Infrastructure of audiovisual services—Coding of moving video—Versatile Video Coding", International Telecommunication Union (ITU), ITU-T Telecommunication Standardization Sector of ITU, Series H: Audiovisual and Multimedia Systems, Recommendation ITU-T H.266, Aug. 2020, 516 pages.

Tsai et al., "Adaptive Loop Filtering for Video Coding", Institute of Electrical and Electronics Engineering, IEEE Journal of Selected Topics in Signal Processing, vol. 7, Issue No. 6, Dec. 2013, 12 pages.

Choi et al., "AHG9/AHG11: SEI message for carriage of neural network information for post filtering", Joint Video Experts Team (JVET) of ITU-T SG 16 WP 3 and ISO/IEC JTC 1/SC 29, Document: JVET-U0091-v3, 21st Meeting, by teleconference, Jan. 6, 2021, 13 pages.

Chujoh et al., "AHG9/AHG11 Level information for super-resolution neural network", Joint Video Experts Team (JVET) of ITU-T SG 16 WP 3 and ISO/IEC JTC 1/SC 29, Document: JVET-U0053-v2, 21st Meeting, by teleconference, Jan. 6, 2021, 6 pages.

Teo et al., "AHG9: ALF control SEI message", Joint Video Experts Team (JVET) of ITU-T SG 16 WP 3 and ISO/IEC JTC 1/SC 29, Document: JVET-T0076-v2, 20th Meeting, by teleconference, Oct. 7, 2020, 11 pages.

"Infrastructure of audiovisual services—Coding of moving video; High efficiency video coding", International Telecommunication Union, ITU-T Telecommunication Standardization Sector of ITU, Series H: Audiovisual and Multimedia Systems, Recommendation ITU-T H.265, Oct. 2014, 540 pages.

"Infrastructure of audiovisual services—Coding of moving video—Information Technology—Generic coding of moving pictures and associated audio information: Video", International Telecommunication Union, Telecommunication Standardization Sector of ITU, Series H: Audiovisual and Multimedia Systems, Recommendation ITU-T H.262, Feb. 2000, 220 pages.

Bordes et al., "HLS for ALF parameters for RPR", Joint Video Experts Team (JVET) of ITU-T SG 16 WP 3 and ISO/IEC JTC 1/SC 29, Document: JVET-W0074, 23rd Meeting, by teleconference, Jul. 7, 2021, 7 pages.

"Transmission of Non-Telephone Signals: Information Technology—Generic Coding of Moving Pictures and Associated Audio Information: Systems", International Telecommunication Union, Telecommunication Standardization Sector of ITU, Recommendation ITU-T H.222.0, Jul. 1995, 135 pages.

Chen et al., "Algorithm description for Versatile Video Coding and Test Model 12 (VTM 12)", Joint Video Experts Team (JVET) of ITU-T SG 16 WP3 and ISO/IEC JTC 1/SC 29, Document: JVET-U2002-v1, 21st Meeting, by teleconference, Jan. 6, 2021, 101 pages.

Teo et al., "Non-CE5: On SEI for ALF", Joint Video Experts Team (JVET) of ITU-T SG 16 WP 3 and ISO/IEC JTC 1/SC 29/WG 11, Document: JVET-Q0319-v1, 17th Meeting, Brussels, Belgium, Jan. 7, 2020, 9 pages.

Chujoh et al., "AHG9/AHG11: Neural network based super resolution SEI", Joint Video Experts Team (JVET) of ITU-T SG 16 WP 3 and ISO/IEC JTC 1/SC 29, Document: JVET-T0092v2, 20th Meeting, by teleconference, Oct. 7, 2020, 4 pages.

* cited by examiner

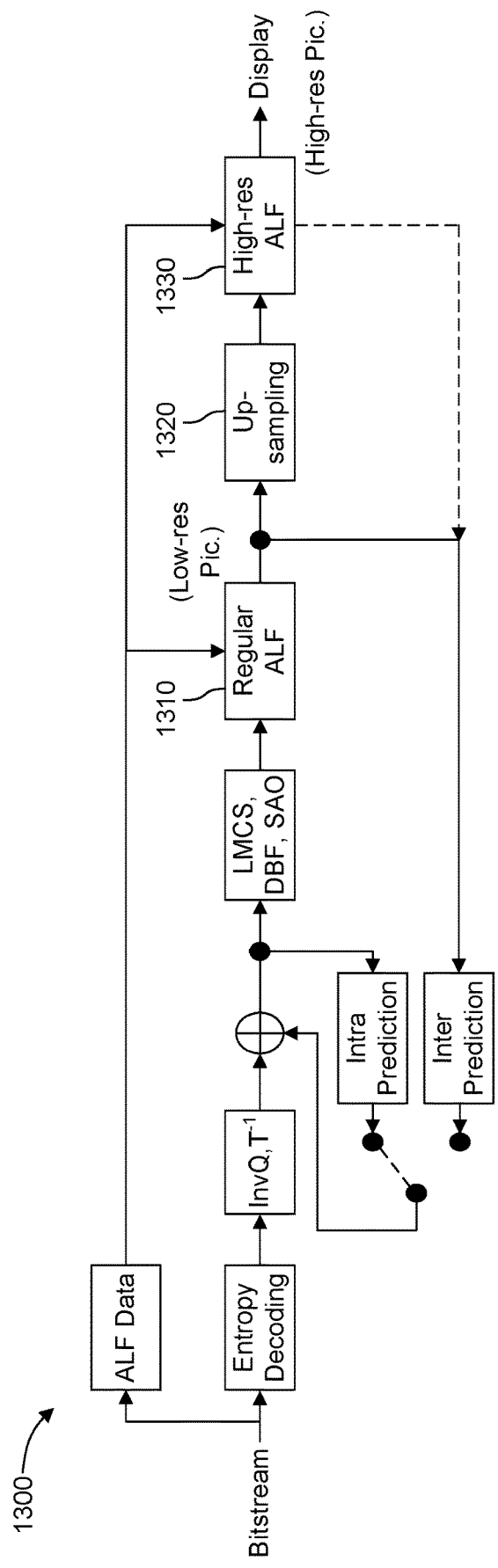
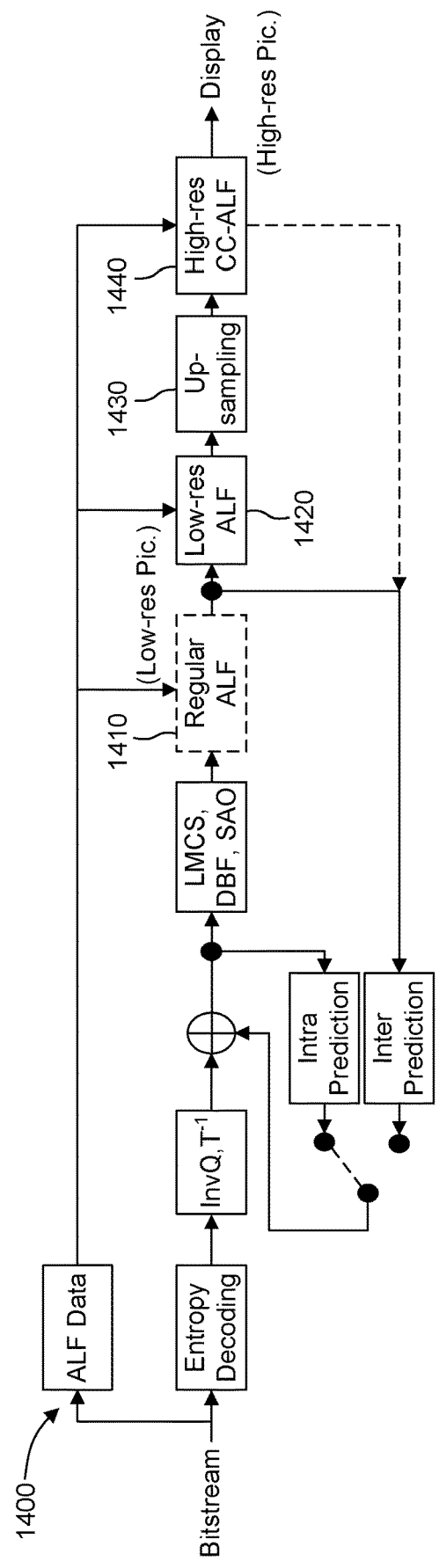
FIG. 13
FIG. 14

METHODS AND APPARATUSES FOR ENCODING/DECODING A VIDEO

CROSS REFERENCE TO RELATED APPLICATIONS

This application is a U.S. National Stage Application under 35 U.S.C. § 371 of International Patent Application No. PCT/EP2022/066450, filed Jun. 16, 2022, which is incorporated herein by reference in its entirety.

This application claims priority to European Application Nos. (i) 21305869.6, filed Jun. 24, 2021, (ii) 21305886.0, filed Jun. 28, 2021, and (iii) 21305939.7, filed Jul. 8, 2021, each of which is incorporated herein by reference in its entirety.

TECHNICAL FIELD

The present embodiments generally relate to a method and an apparatus for video encoding or decoding. Some embodiments relate to methods and apparatuses for video encoding or decoding where original pictures and reconstructed pictures are dynamically re-scaled for encoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an aspect, a method for decoding a first picture at a first resolution from a video is provided, wherein decoding the first picture comprises up-sampling a decoded picture to the first resolution, the decoded picture being encoded at a second resolution, the second resolution being lower than the first resolution, and applying an adaptive filter to at least one component of the up-sampled decoded picture.

According to another aspect, an apparatus for decoding a video is provided, wherein the apparatus comprises one or more processors, wherein said one or more processors are configured for decoding, a first picture at a first resolution from a video wherein decoding the first picture comprises up-sampling a decoded picture to the first resolution, the decoded picture being encoded at a second resolution, the second resolution being lower than the first resolution, and applying an adaptive filter to at least one component of the up-sampled decoded picture. According to another aspect, a method for encoding a first picture of a video is provided, the first picture having a first resolution, encoding the first picture comprises down-sampling the first picture to a second resolution lower than the first resolution, encoding and reconstructing the down-sampled picture, up-sampling the reconstructed picture to the first resolution, and applying an adaptive filter to at least one component of the up-sampled decoded picture.

According to another aspect, an apparatus for encoding a video is provided, wherein the apparatus comprises one or more processors, wherein said one or more processors are configured for encoding a first picture of the video, the first picture having a first resolution, encoding the first picture comprising down-sampling the first picture to a second resolution lower than the first resolution, encoding and reconstructing the down-sampled picture, up-sampling the reconstructed picture to the first resolution, and applying an adaptive filter to at least one component of the up-sampled decoded picture.

According to an embodiment, the filtered decoded/reconstructed picture is stored in a decoded picture buffer at the first resolution.

One or more embodiments also provide a computer program comprising instructions which when executed by one or more processors cause the one or more processors to perform the encoding method or decoding method according to any of the embodiments described herein. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

BRIEF DESCRIPTION OF THE DRAWINGS

FIG. 13 illustrates an example of a decoder with RPR enabled and ALF applied on high-res pictures after up-sampling, according to an embodiment.

FIG. 14 illustrates an example of a decoder with RPR enabled and ALF applied on low-res pictures and high-res pictures, according to an embodiment.

DETAILED DESCRIPTION

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
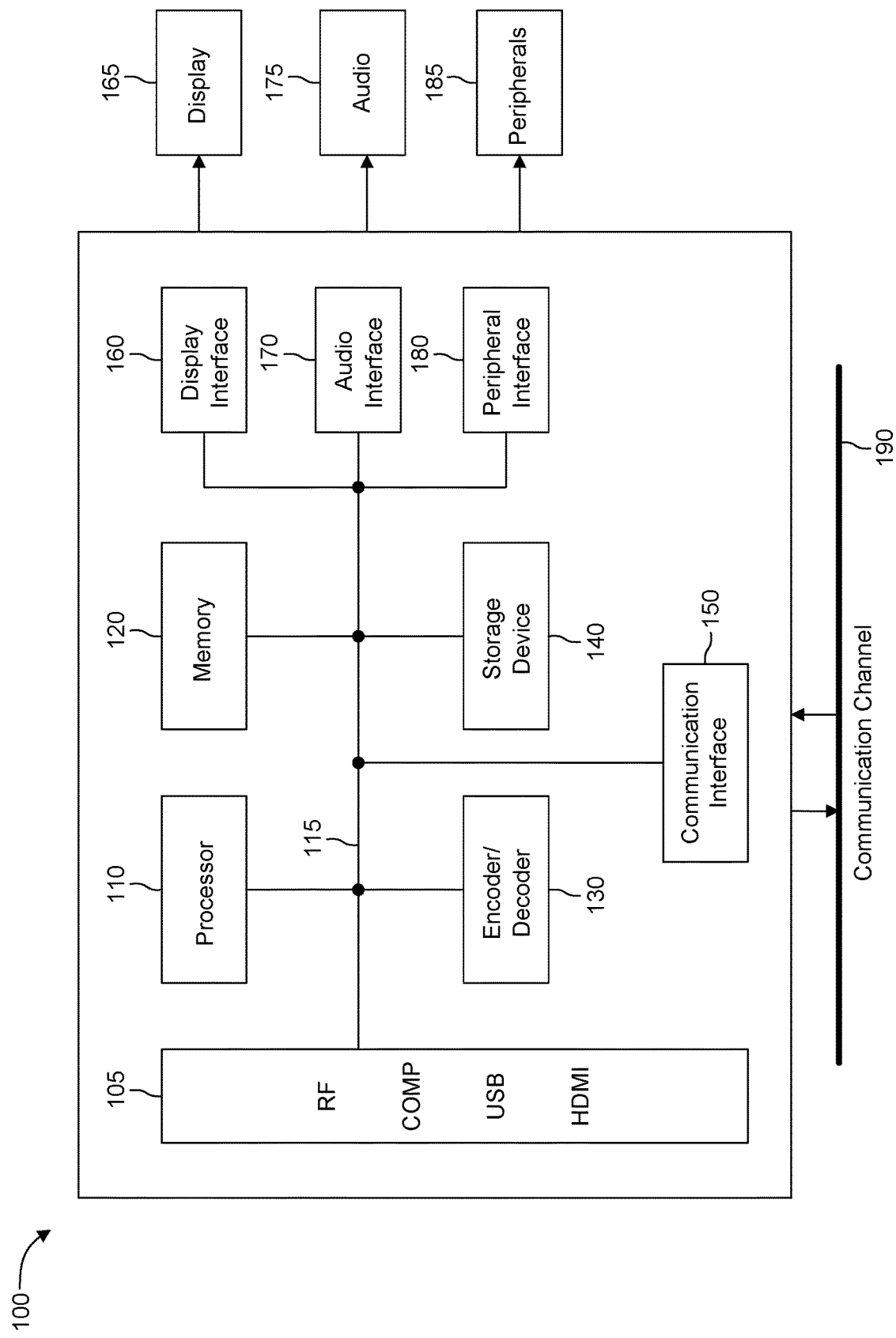
FIG. 1 illustrates a block diagram of a system within which aspects of the present embodiments may be implemented.
Figure 2:
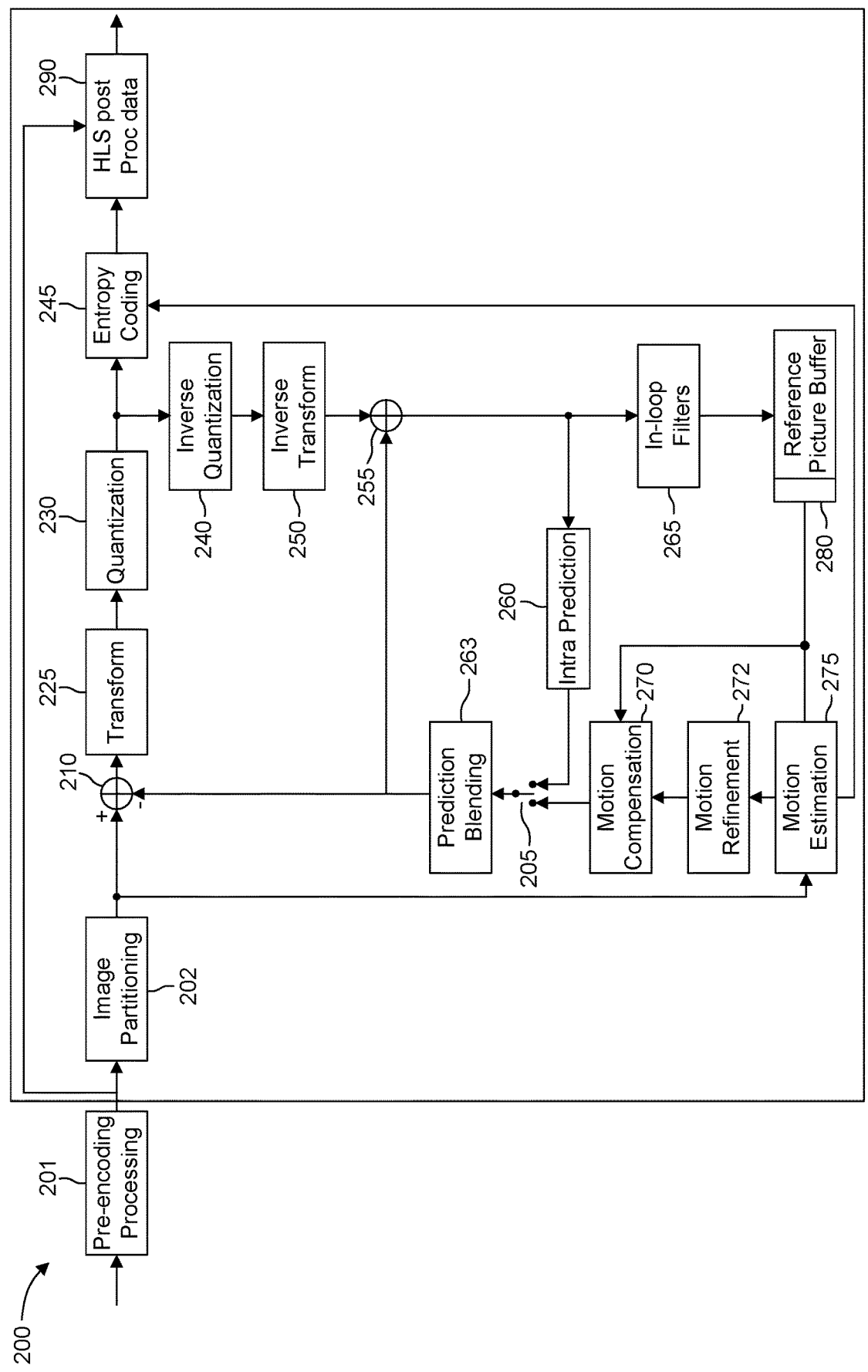
FIG. 2 illustrates a block diagram of an embodiment of a video encoder.
Figure 3:
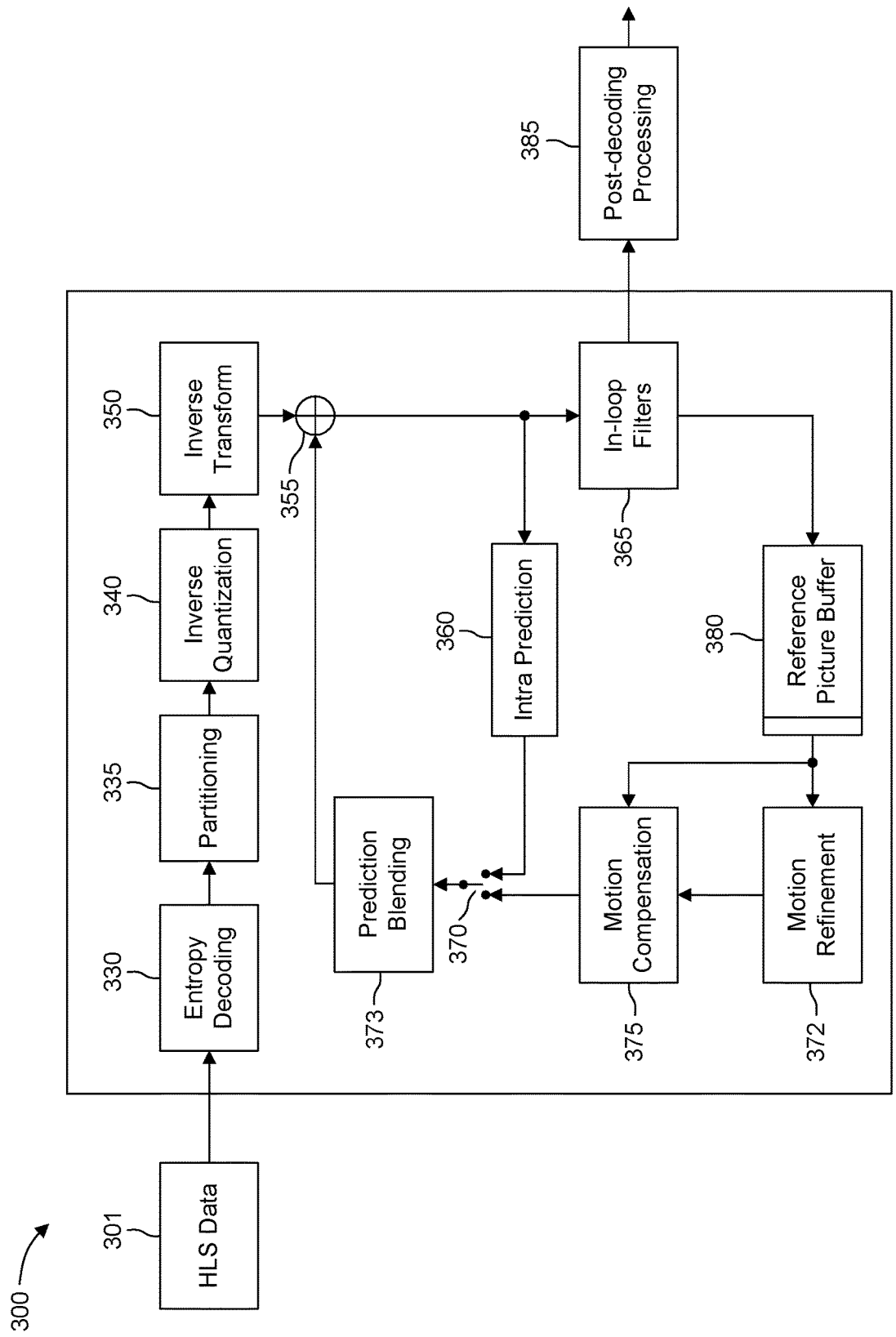
FIG. 3 illustrates a block diagram of an embodiment of a video decoder.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, of a video encoder 200 and decoder 300 as shown in FIG. 2 and FIG. 3. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In some embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 100 may be provided through various input devices as indicated in block 105. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1, include composite video.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which can be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11 (IEEE refers to the Institute of Electrical and Electronics Engineers). The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105. As indicated above, various embodiments provide data in a non-streaming manner. Additionally, various embodiments use wireless networks other than Wi-Fi, for example a cellular network or a Bluetooth network.

The system 100 may provide an output signal to various output devices, including a display 165, speakers 175, and other peripheral devices 185. The display 165 of various embodiments includes one or more of, for example, a touchscreen display, an organic light-emitting diode (OLED) display, a curved display, and/or a foldable display. The display 165 can be for a television, a tablet, a laptop, a cell phone (mobile phone), or other device. The display 165 can also be integrated with other components (for example, as in a smart phone), or separate (for example, an external monitor for a laptop). The other peripheral devices 185 include, in various examples of embodiments, one or more of a stand-alone digital video disc (or digital versatile disc) (DVR, for both terms), a disk player, a stereo system, and/or a lighting system. Various embodiments use one or more peripheral devices 185 that provide a function based on the output of the system 100. For example, a disk player performs the function of playing the output of the system 100.

In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

The embodiments can be carried out by computer software implemented by the processor 110 or by hardware, or by a combination of hardware and software. As a non-limiting example, the embodiments can be implemented by one or more integrated circuits. The memory 120 can be of any type appropriate to the technical environment and can be implemented using any appropriate data storage technology, such as optical memory devices, magnetic memory devices, semiconductor-based memory devices, fixed memory, and removable memory, as non-limiting examples. The processor 110 can be of any type appropriate to the technical environment, and can encompass one or more of microprocessors, general purpose computers, special purpose computers, and processors based on a multi-core architecture, as non-limiting examples.

Figure 4:
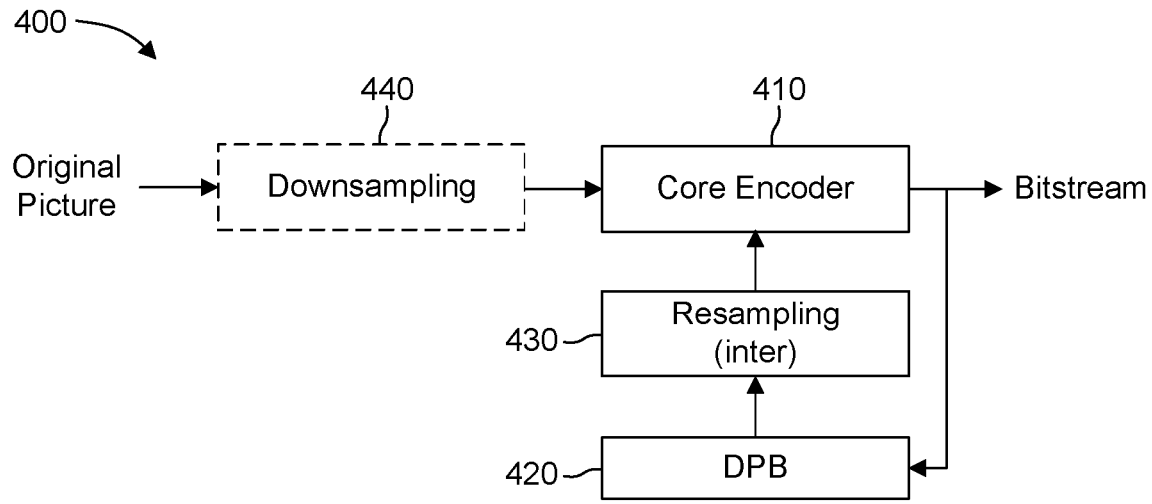
FIG. 4 illustrates an example method for encoding a video according to an embodiment.
Figure 5:
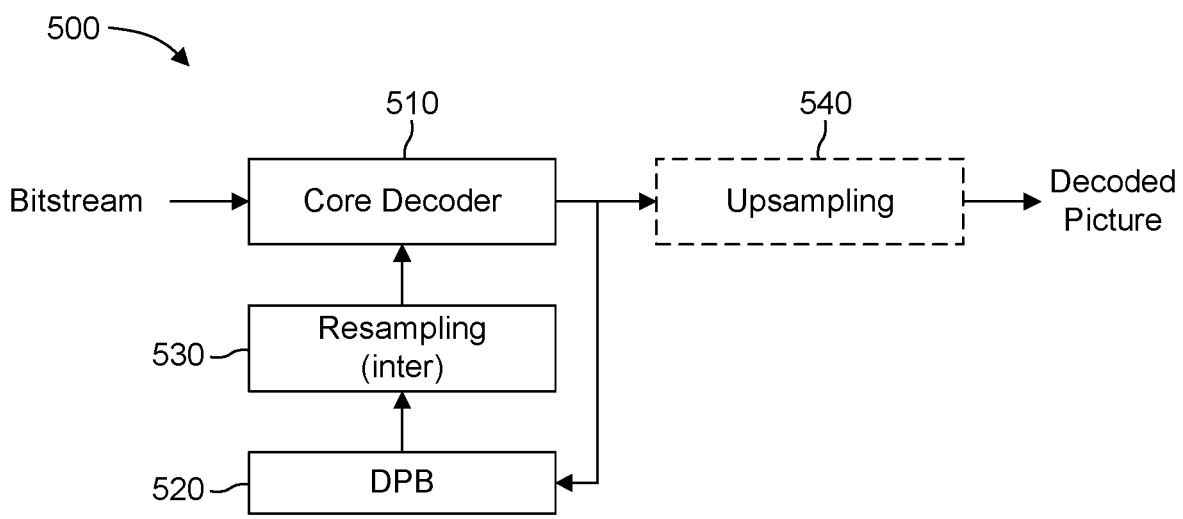
FIG. 5 illustrates an example method for reconstructing a video according to an embodiment.

According to an aspect a method for encoding/decoding a video is disclosed, wherein the original pictures to encode and the pictures obtained from decoding can be dynamically re-scaled for the sake of better coding efficiency trade-off. FIGS. 4 and 5 illustrate example methods for encoding (400) and decoding (500), respectively, a video according to an embodiment wherein an image to encode can be re-scaled for encoding, such as in the RPR (for Reference Picture Resampling) tool of VVC. For instance, such encoder and decoder can be compliant with the VVC standard. Given an original video sequence composed of pictures of size (picWidth×picHeight), the encoder chooses for each original picture a resolution (i.e. picture size) for coding the frame. Different PPS (for Picture Parameter Set) are coded in the bit-stream with the size of the pictures and the slice/picture header of a picture to decode indicates which PPS to use on the decoder side to decode the picture.

The down-sampler (440) and the up-sampler (540) functions used as pre- or post-processing respectively are not specified by some existing standards such as HEVC, or VVC.

For each frame, the encoder chooses whether to encode at original or down-sized resolution (ex: picture width/height divided by 2). The choice can be made with two passes encoding or considering spatial and temporal activity in the original pictures.

When the encoder chooses to encode an original picture at a down-sized resolution, the original picture is down-scaled (440) before being input to the core encoder (410) to produce a bitstream. According to an embodiment, the reconstructed picture at the downscaled resolution is then stored (420) in the decoded picture buffer (DPB) for coding subsequent pictures. Consequently, the decoded picture buffer (DPB) can contain pictures with different size from the current picture size.

At the decoder, the picture is decoded (510) from the bitstream and the reconstructed picture at the downscaled resolution is stored (520) in the decoded picture buffer (DPB) for decoding subsequent pictures. According to an embodiment, the reconstructed picture is upsampled (540) to its original resolution and for instance transmitted to a display.

According to an embodiment, in case a current picture to be encoded uses a reference picture from the DPB that has a size different from the current picture, a re-scaling (430/530) (up-scale or down-scale) of the reference block to build the prediction block is made explicitly (before motion compensation) or implicitly during the motion compensation process.

Up-Sampling and Down-Sampling Filters

In traditional video codecs, the resampling processes (down-sampling, and up-sampling) are carried out using linear filters. Preferably, the filters are composed of two 1D re-sampling filters (horizontal and vertical) applied consecutively to reduce complexity.

Figure 6:
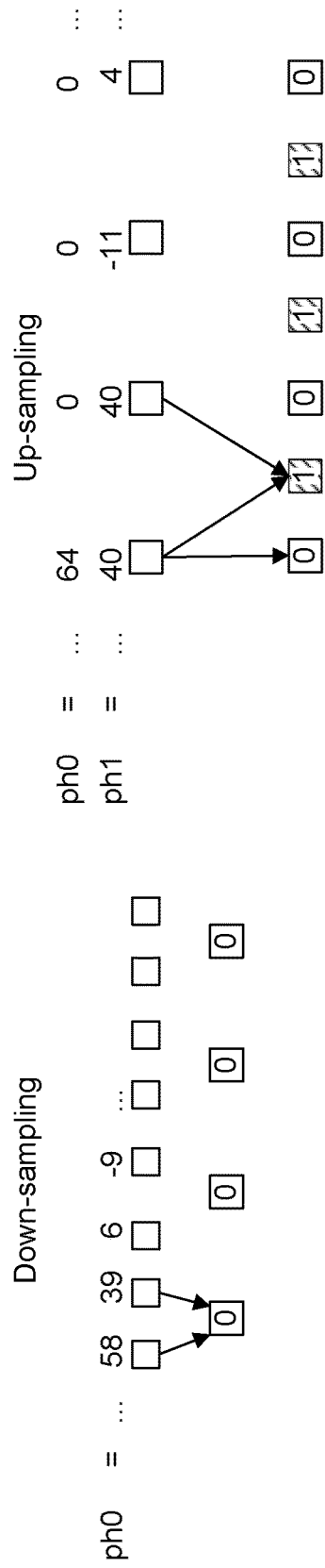
FIG. 6 illustrates an example of sample positions (phases) associated with re-sampling filters.

The re-sampling filter coefficients depend on the reconstructed sample position (also known as sample phase) in the re-sampled picture. For example, FIG. 6 depicts two phases for horizontal up-sampling filter while down-sampling has one phase: original samples are shown as squares on the top line with example of filter coefficients applied to the original samples shown above, re-sampled samples are shown on the bottom line with number inside indicating the phase of 0, 1 of the sample. In general, to avoid aliasing, one prefers choosing down-sample positions in-between original sample positions, whereas some up-samples positions may be co-located with original to avoid over smoothing.

A set of coefficients is associated with each sample phase. It may happen that a re-sampled value is same as input sample. This may happen for up-sampling typically. In FIG. 6, one depicts the coefficients used for each phase, for down-sampling and up-sampling cases, in an example of the VVC reference software. In this example, the phase-0 up-sampling is the same as the input.

Down-sampling coefficients: ph0={2, −3, −9, 6, 39, 58, 39, 6, −9, −3, 2, 0}

Up-sampling coefficients: ph0={0, 0, 0, 64, 0, 0, 0, 0} ph1={−1, 4, −11, 40, 40, −11, 4, −1}

In VVC, there are 4 in-loop filters: luma-mapping chroma scaling (LMCS), deblocking filter (DBF), sample adaptive offset (SAO) and ALF (Adaptive Loop Filtering).

Figure 7:
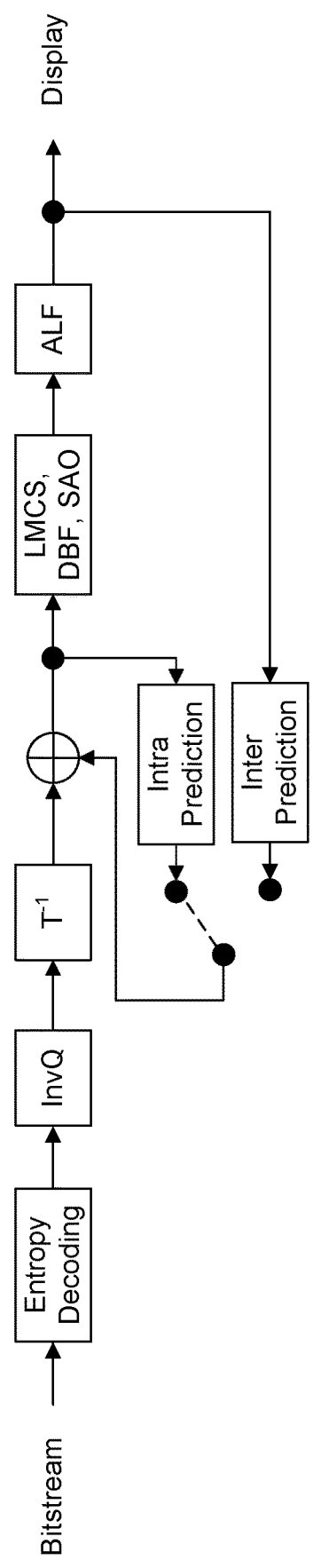
FIG. 7 illustrates an example of a decoder, according to an embodiment.

FIG. 7 illustrates an example of a decoder showing that these in-loop filters are applied to a reconstructed picture obtained after entropy decoding the bitstream, inverse quantization—invQ—, inverse transformation—$T^{-1}$—providing the reconstructed residual, intra prediction or inter prediction and addition of the reconstructed residual.

The in-loop ALF filter (adaptive loop filtering) is a linear filter whose purpose is to reduce coding artefacts on the reconstructed samples.

Figure 9:
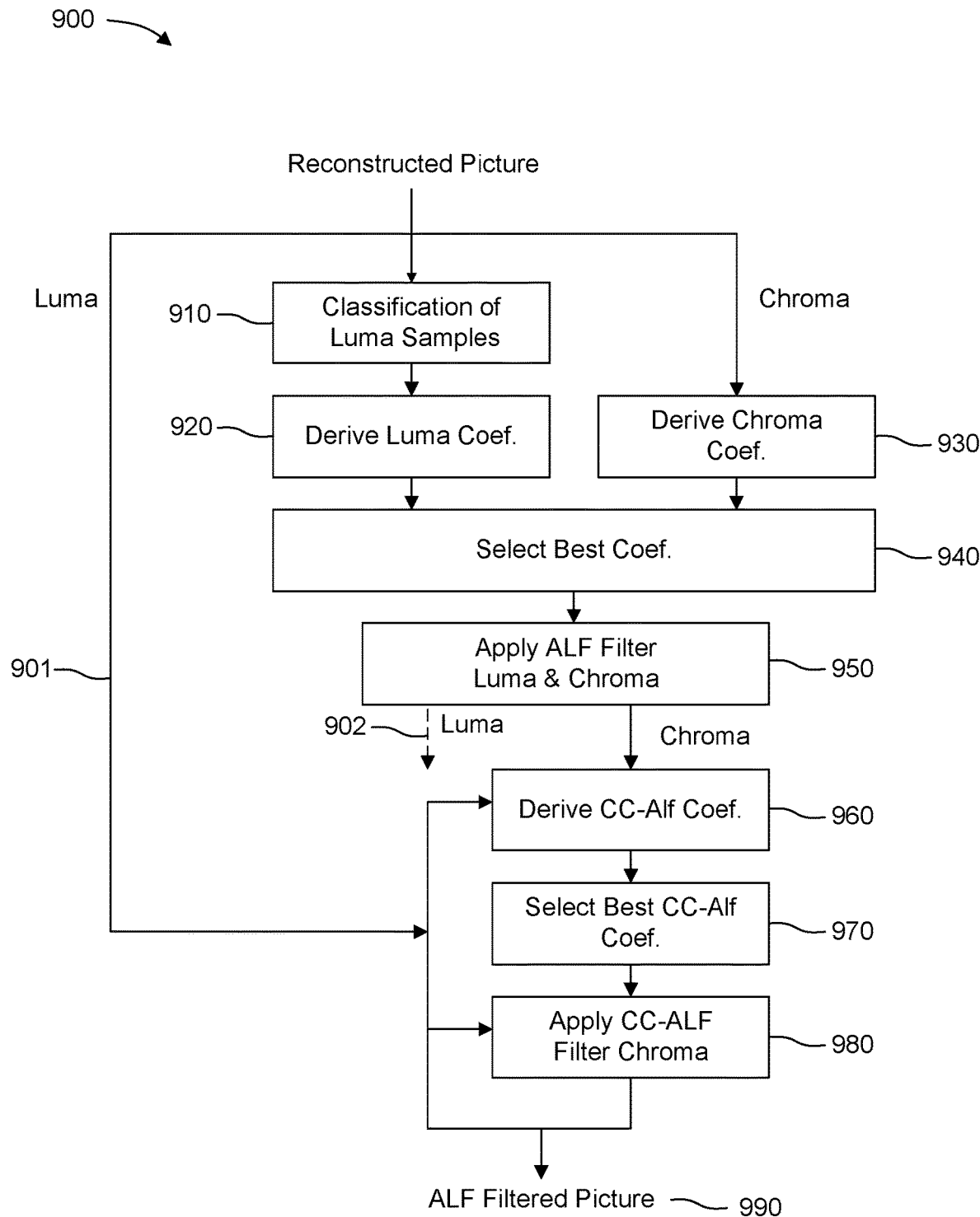
FIG. 9 illustrates an example of a method for filtering a reconstructed picture according to an embodiment.

FIG. 9 illustrates an example of a method 900 for filtering a reconstructed picture according to an embodiment. The coefficients "$c_n$" of the filter are determined (920 for the luma component, 930 for the chroma components) on the encoder side so that to minimize the mean square error between original samples "s(r)" and filtered samples "f(r)" by using Wiener-based adaptive filter technique.

$$f(r) = \sum_{n=0}^{N-1} c_n \cdot t(r + p_n) \quad \text{(eq. 1)}$$

where:
- r=(x,y) is the sample location belongs to the to-be-filtered region "R".
- Original sample: s(r)
- To-be-filtered sample: t(r)
- FIR filter with N coefficients: c=[$c_0$, . . . $c_{N-1}$]T
- Filter tap position offset: {$p_0$, $p_1$, . . . $p_{N-1}$}, where $p_n$ denotes the sample location offset to r of the $n^{th}$ filter tap. In the following the set of tap positions is also named the filter "shape".
- Filtered sample: f(r)

To find the minimum sum of squared errors (SSE) between s(r) and f(r), the derivatives of SSE can be calculated with respect to $c_n$ and the derivatives are set equal to zero. Then the coefficient values "c" are obtained by solving the following equation (920, 930 from FIG. 9):

$$[Tc].c^T = v^T \quad \text{(eq. 2)}$$

where:

$$[Tc] = \begin{bmatrix} \sum_R t(r+p_0) \cdot t(r+p_0) & \sum_R t(r+p_1) \cdot t(r+p_0) & \ldots & \sum_R t(r+p_{N-1}) \cdot t(r+p_0) \\ \sum_R t(r+p_0) \cdot t(r+p_1) & \sum_R t(r+p_1) \cdot t(r+p_1) & \ldots & \sum_R t(r+p_{N-1}) \cdot t(r+p_1) \\ \ldots & \ldots & \ldots & \ldots \\ \sum_R t(r+p_0) \cdot t(r+p_{N-1}) & \sum_R t(r+p_1) \cdot t(r+p_{N-1}) & \ldots & \sum_R t(r+p_{N-1}) \cdot t(r+p_{N-1}) \end{bmatrix}$$

$$v = \begin{bmatrix} \sum_R s(r) \cdot t(r+p_0) \\ \sum_R s(r) \cdot t(r+p_1) \\ \ldots \\ \sum_R s(r) \cdot t(r+p_{N-1}) \end{bmatrix}$$

According to the VVC standard, the reconstructed luma samples "t(r)" are classified (910) into K classes (for instance K=25 for luma samples, K=1 for chroma samples) and K different filters are determined with the samples of each class. The classification is made with Directionality and Activity values derived with local gradients.

In VVC, the coefficients of the ALF may be coded in the bitstream so that they can be dynamically adapted to the video content. There are also some default coefficients. At 940, the encoder selects and indicates which set of coefficients to be used per CTU between the coefficients derived at 920, 930 and the default coefficients, or if the CTU is not filtered. At 950, the selected coefficients are applied to the reconstructed picture.

Figure 8:
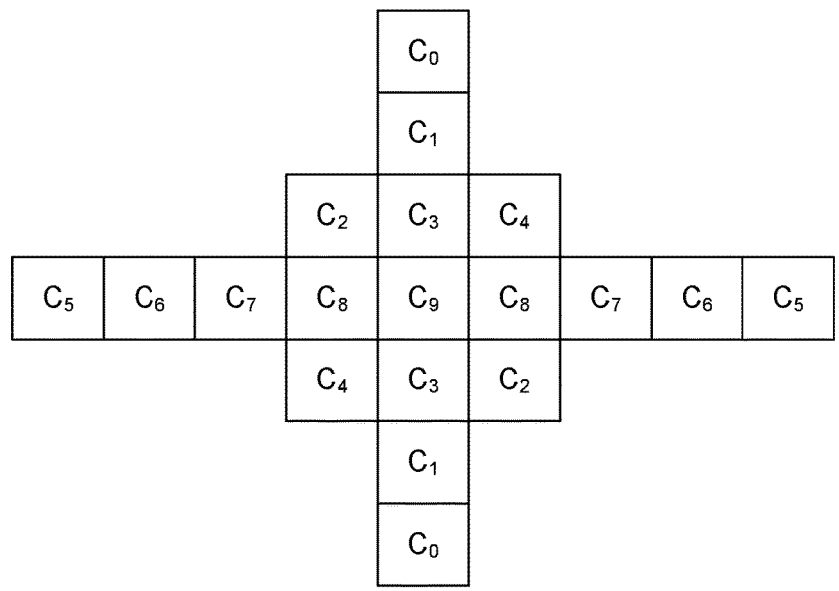
FIG. 8 illustrates examples of symmetrical filter and filter rotation.
Figure 8:
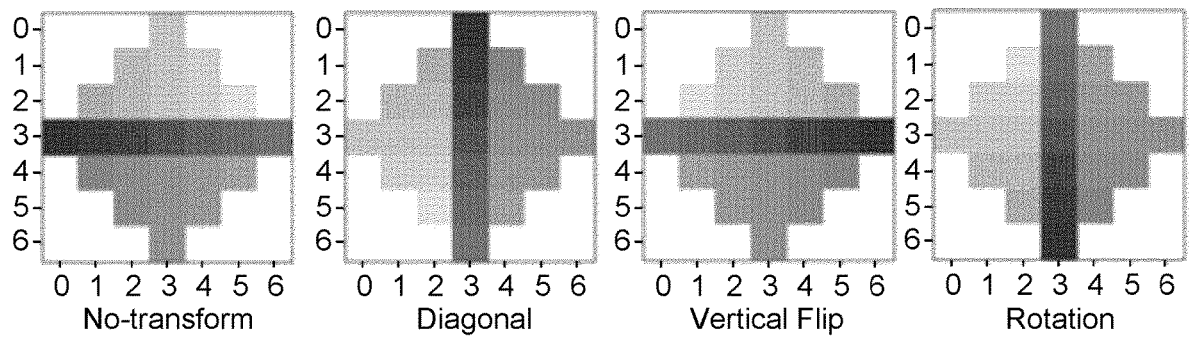

In VVC, symmetrical filters can be used (top part of FIG. 8) and some filters may be obtained from other filter by rotation (bottom part of FIG. 8).

CC-ALF

According to an embodiment, an additional cross-component filter (CC-ALF) may correct chroma samples. At 960, the correction CC-ALF coefficients are determined. The correction is made as a linear combination of co-located reconstructed luma samples. In (eq. 1,2), the values of s(r) are the target (original) chroma sample values, t(r) are luma sample values before ALF (901) and f(r) is the chroma correction. In a variant, t(r) are luma sample values after ALF (902). As for the ALF coefficients, at 970, the encoder selects, for instance based on a rate-distortion criterion, the CC-ALF coefficients which are then applied to the chroma components at 980.

A filtered picture is thus obtained at 990.

On the encoder side, information of coefficients selection is transmitted in the bitstream, with filter coefficients if necessary. On the decoder side, the method of filtering a reconstructed picture corresponds to steps 910, 950 and 980 eventually. The coefficients are obtained using the transmitted information from the bitstream.

ALF Parameters

Figure 10:
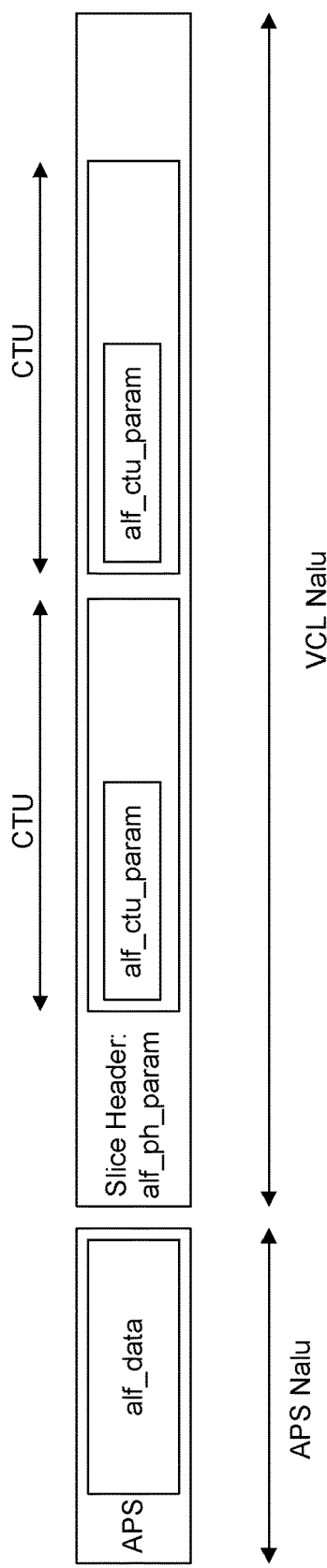
FIG. 10 illustrates an example of the structure of a bitstream for transmitting ALF filter parameters, according to an embodiment.

According to the VVC standard, for a given picture, the ALF coefficients may be coded in one APS nal unit. At the CTU level, the ALF coefficients may be retrieved from previous APS (Adaptive Parameters Set) or from some defaults. The ALF process is carried out at CTU-basis. The ALF parameters are three folds (an example of a structure of a bitstream for ALF parameters is illustrated on FIG. 10):

- Alf_ph_param: in picture or slice header: 5 flags indicating whether ALF and CC-ALF are activated for each component: sh_alf_enabled[i=0,1,2], sh_alf_cc_cb_enabled_flag, sh_alf_cc_cr_enabled_flag.
- 1 Alf_aps_param: In APS: some ALF and CC-ALF coefficient filters are coded: alf_data( )
- Alf_ctu_param: for each CTU, in the CTU header (coded picture), it is signaled per component:
  - if ALF is enabled: alf_ctb_flag[i=0, 1, 2][ctu].
  - and if yes, which filter index to use for each component: alf_luma_fixed_filter_idx (luma), alf_ctb_filter_alt_idx[0,1][ctu], alf_ctb_cc_cb_idc[ctu], alf_ctb_cc_cr_idc[ctu]

Other parameters/syntax elements may also be signaled.

In VVC, the Alf_ph_param and Alf_aps_param use variable length coding (VLC) coding, whereas Alf_ctu_param uses entropy coding (CABAC).

The design of ALF filters in VVC has been adopted to reduce coding distortion between the encoder input picture (a.k.a. original) used as target reference and the reconstructed/decoded picture. However, when RPR is enabled, the input picture is a down-scaled (low-res for low resolution) version of the high-res (for high resolution) original picture, whereas the desired target for display is still the high-resolution pictures.

Figure 11:
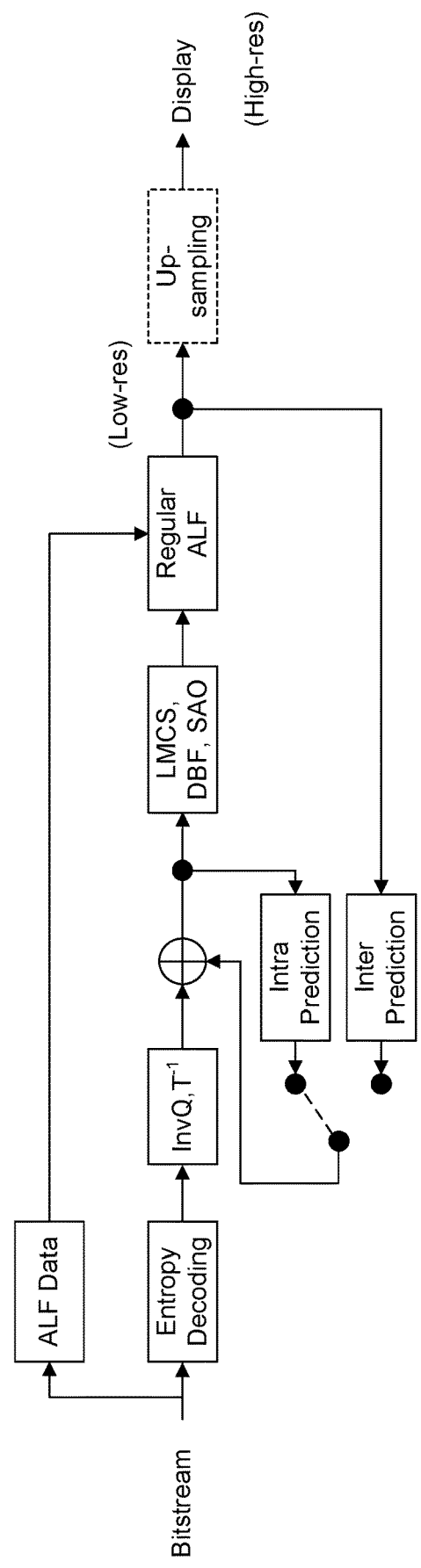
FIG. 11 illustrates an example of a decoder with RPR enabled and ALF applied on low-res pictures, according to an embodiment.

Thus, according to the embodiments described above, the ALF coefficients are optimized to reduce coding artefacts in the low-res picture, while, as illustrated on FIG. 11, the reconstructed picture that is transmitted for display is the up-sampled (high-res) picture. As shown in FIG. 11, "regular" ALF is applied to the reconstructed downscaled picture using the transmitted ALF data, the filtered low-res picture is next up-sampled to a high-res picture for display.

In the current VVC design, when RPR is enabled for some pictures, the reconstructed pictures may be at lower spatial resolution (low-res in the following) or at high spatial resolution (high-res in the following) depending on whether the RPR is activated or not for these pictures. However, the same ALF coefficients are applied on reconstructed pictures whatever their resolution.

Thus, there is a need for improving the state of the art.

A method for signaling and encoding adaptive filter parameters for reducing the distortion of the up-sampled reconstructed frames is provided. Also, some methods to carry out up-sampling with adaptive post-filters are provided.

Methods and apparatuses for encoding/decoding a video are provided. A picture from a video is decoded from a bitstream, the picture being encoded in the bitstream at a resolution which is lower than an original resolution of the picture. In other words, the picture has been down-sampled before encoding. Decoding the picture further comprises up-sampling the decoded picture to the original resolution, and applying an adaptive filter to at least one first component of the up-sampled decoded picture. In some embodiments, the adaptive filter can be performed in-loop or out-of-loop of the decoding/encoding process.

Figure 12:
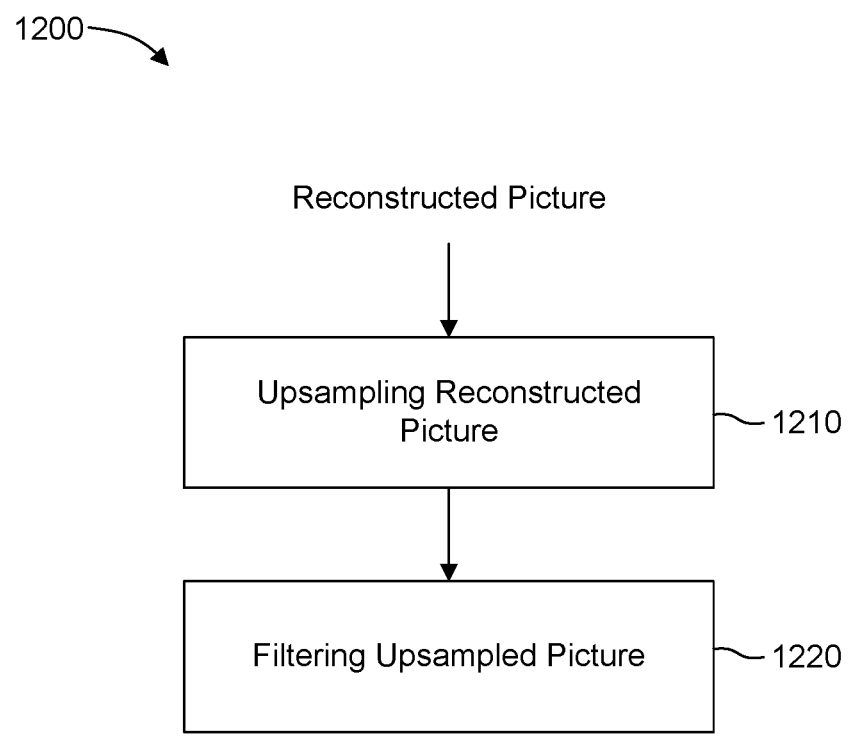
FIG. 12 illustrates a block diagram of a method for decoding/encoding a video, according to an embodiment.

FIG. 12 illustrates a block diagram of a method 1200 for decoding, respectively encoding, a video, according to an embodiment. A reconstructed picture is taken as input. In the method for decoding a video, the reconstructed picture is obtained from the decoding of a current picture of the video from a received bitstream. In the method for encoding a video, the reconstructed picture is obtained from an encoding of a current picture of the video. The reconstructed picture has been encoded in the bitstream in a downscaled version from the original picture resolution. In other words, before encoding, the current picture (high-res) picture having a first spatial resolution is down-sampled to a second spatial resolution, the second spatial resolution being lower than the first spatial resolution. The downscaled (low-res) picture is then encoded in the bitstream or decoded from the bitstream, for instance according to the RPR technology from the VVC standard.

At 1210, the reconstructed picture is up-sampled to the first resolution, and at 1220 an adaptive filter is applied to at least one component (luma, chroma) of the up-sampled reconstructed picture. In some embodiments, the up-sampled reconstructed picture may be stored in the decoded picture buffer for future use for inter-prediction when encoding/decoding other pictures, and/or the up-sampled reconstructed picture may be transmitted to a display.

In the following, one will denote "regular ALF" the regular ALF (Adaptive Loop Filter) and CC-ALF (Cross-Component Adaptive Loop Filter) processes as described in VVC that apply on the reconstructed pictures, whatever their resolution.

In the following, embodiments are described in the context of using ALF and CC-ALF as described in the VVC standards, it should be understood that the principles described herein apply to any kind of adaptive filtering in in-loop or out-of-loop in post-processing of the reconstructed picture, when combined with an encoding of the pictures wherein the current picture can be encoded in a downscaled version.

In the following, only decoding methods are described. Similar processes are implemented in encoding methods, as encoding comprises some parts of the decoding (reconstruction of the picture for in-loop processes).

Up-Sampling Filter Next ALF

In an embodiment, in order to improve the up-sampled reconstructed pictures, one can apply ALF process (high-res ALF) after the up-sampling process, as illustrated in FIG. 13. FIG. 13 illustrates a block diagram of a method 1300 for decoding a video according to an embodiment. As shown in FIG. 13, "regular" ALF (1310) is applied to the reconstructed downscaled picture using the transmitted ALF data, the filtered low-res picture is then up-sampled (1320) to a high-res picture for display. ALF or adaptive filter is applied to the up-sampled picture (1330). In a variant, the low-res picture filtered by the "regular" ALF is stored in the DPB for subsequent picture inter-prediction.

In another variant, this is the high-res picture filtered at 1330 that is stored in the DPB (represented by dashed line in FIG. 13) for subsequent picture inter-prediction.

In a variant, on the encoding side, the coefficients and filter indexes used in the filtering of the high-res picture have been selected targeting the original high-res picture.

According to a variant, one may perform another classification (910 from FIG. 9) using the luma samples corrected with the regular ALF process (filtered picture obtained at 990 from FIG. 9). Or, in another variant, the classification (910) done by the regular ALF process is re-used to reduce the complexity.

The up-sampling process (up-sampling filters) may be specified or not by the specification. Depending on variants described above, the up-sampling may be performed in-loop or out of the encoding loop.

One can re-use part of the regular ALF parameters (ex: alf_ctb_flags) and code other high-res ALF parameters or code full high-res ALF parameters (as will be explained further below).

The alf_ctu_param are CTU-based. One may choose a CTU size different from the regular CTU size. It may be derived from the regular CTU size re-scaled in same proportion as the up-scaling process.

If the high-res ALF has its own parameters, one may choose to enable or disable the regular ALF and high-res ALF separately with appropriate syntax. In a variant, the regular ALF and high-res ALF processes are mutually exclusive (regular ALF and high-res ALF cannot be activated together for the same slice or picture). In this case, one can maximally re-use the regular syntax for ALF parameters and only one set of ALF parameters is present in the bitstream.

In another variant, the high-res pictures are stored in the DPB so that the DPB may contain high-res pictures after up-sampling and high-res ALF possibly. In another variant, a flag is coded per picture and indicates whether the high-res picture should be stored in the DPB or not.

In another variant, the input to the up-sampling module is the reconstructed samples before the regular ALF. Then the low-res pictures will be displayed with regular ALF, whereas the high-res pictures will be displayed with high-res ALF but only one level of ALF filter is applied.

Single Phase ALF Correction Only, Next Up-Sampling

Experimental results have shown the performance of the regular RPR scheme may be low for chroma particularly.

In another embodiment, the high-res adaptive filtering is a CC-ALF only. FIG. 14 illustrates a block diagram of a method 1400 for decoding a video according to an embodiment.

Figure 15:
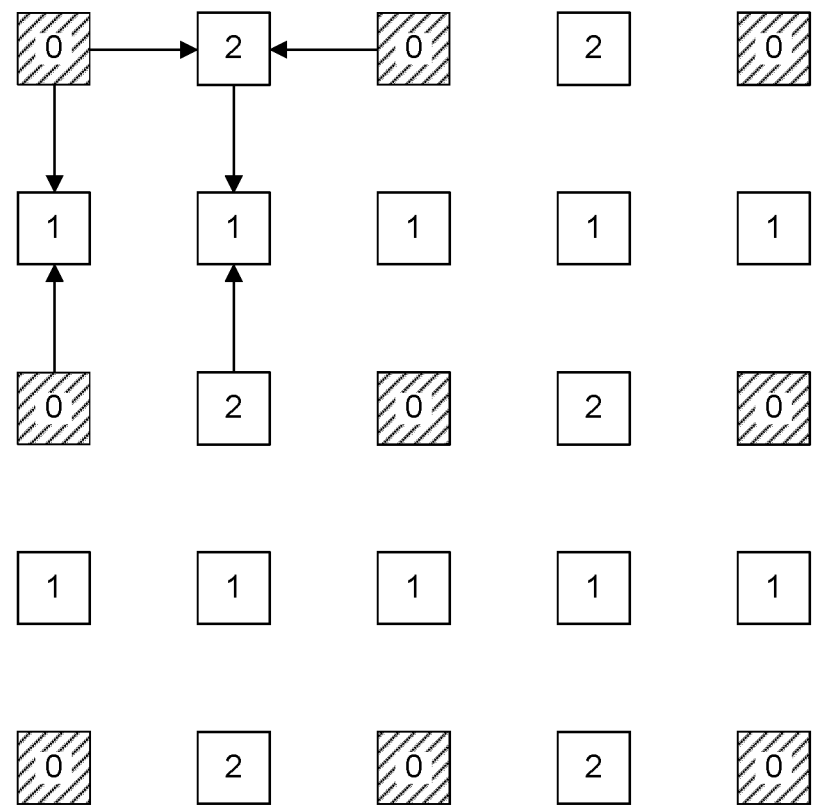
FIG. 15 illustrates examples of sample positions (phase) in a block of a high-res picture.
Figure 16:
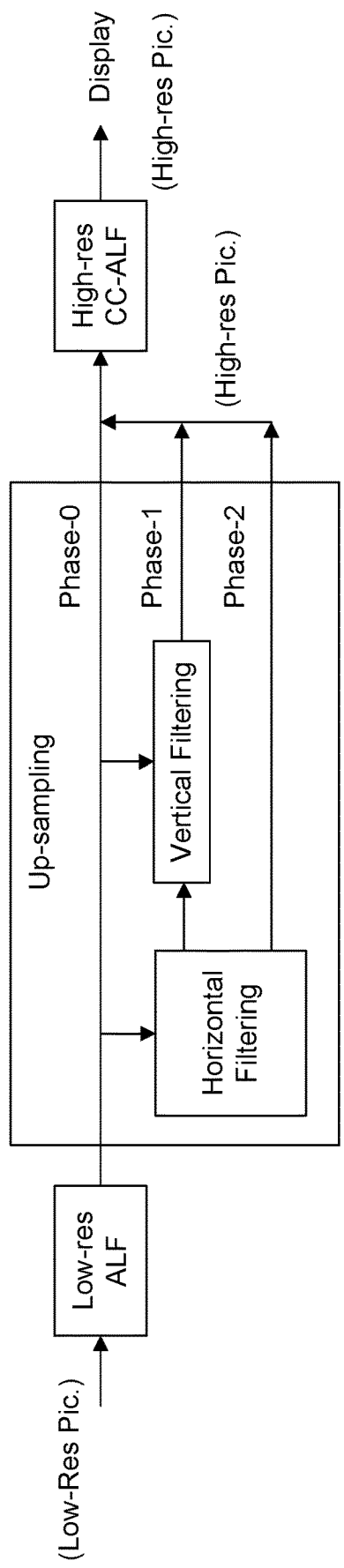
FIG. 16 illustrates an example of low-res ALF applied with phase-0 before up-sampling and high-res ALF after up-sampling, according to an embodiment.

In a variant, ALF is performed on the reconstructed low-res picture (1420) before up-sampling (1430), after regular ALF or before regular ALF (1410), and CC-ALF (1440) is performed after up-sampling (1430) on high-res picture. In this variant, the low-res ALF (1420) differs from the regular ALF (1410) since it uses different target samples to derive the coefficients, then the coefficients of low-res and regular ALF may be different. Regular ALF uses the down-sampled version of the original picture to derive the coefficients. While, for example, the low-res ALF coefficients may be derived targeting one particular phase-X (e.g. phase-0 samples illustrated as grey squares in FIG. 15) of the high-res original picture samples. As illustrated on FIG. 16, the low-res ALF is applied on the low-res reconstructed samples. Advantageously, the up-sampling process uses the low-res samples corrected with the low-res ALF for phase-X samples, and the other phases samples are derived with this corrected (low-res ALF filtered) phase-X samples (with horizontal and vertical filtering), providing a high-res picture. Next, high-res CC-ALF is applied on the up-sampled (high-res) picture.

In a variant, at 1440, ALF plus CC-ALF can be performed.

In another variant, the regular ALF at 1410 may not be performed.

Virtual Boundaries

Figure 17:
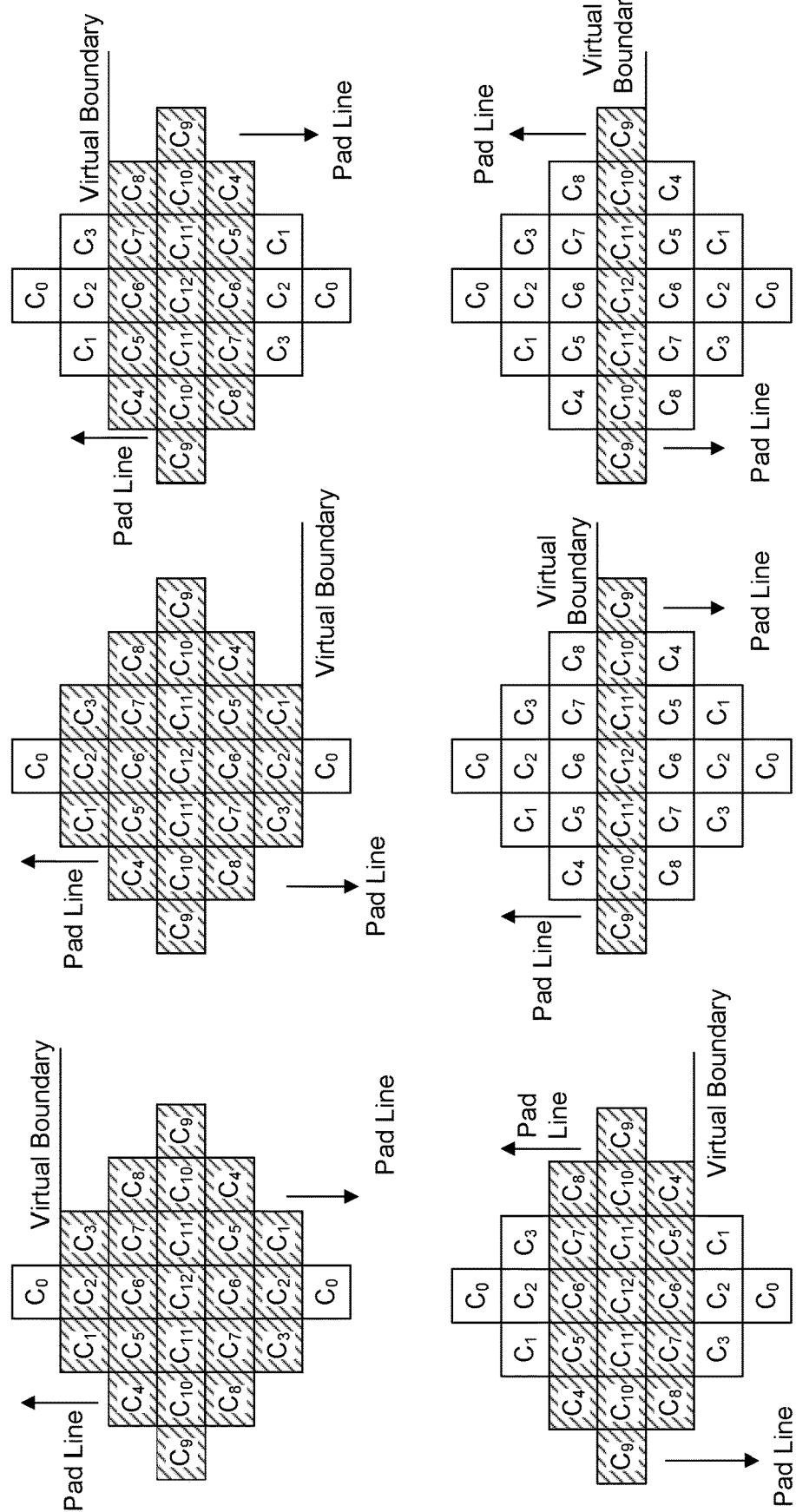
FIG. 17 illustrates an example of a modified ALF filtering for luma component at virtual boundaries, according to an embodiment.

In the VVC standard, the ALF process is adapted for Virtual Boundaries. The Virtual boundaries correspond to slice or tile frontiers. For parallelism reason, the samples outside the virtual boundaries are not accessed. In case of ALF filtering, to keep symmetry in the filter pattern, the samples symmetrical to the out of virtual boundary frontier samples are not used as depicted in FIG. 17.

However, in case the up-sampled pictures are not stored in the DPB, the up-sampling process is optional (not normative), then it may be carried out by an external module. At the decoder side, the up-sampling process followed by the ALF filter process as described in any one of the embodiments above is less computational power demanding and may no more need parallelism. Thus according to another embodiment, the virtual boundaries limitation process is disabled for the high-res adaptive filtering process provided herein.

High Level Syntax (HLS)

In one embodiment, additional syntax elements allow signaling and coding the proposed high-res (or low-res) ALF parameters.

For example, a new APS type "ALF_RPR_APS" is created (as illustrated in example by table 1 and 2 below). The type and syntax of the associated ALF data alf_data_rpr( ) are the same as alf_data( ), except that they refer to the new high-res (or low-res) ALF and regular ALF parameters respectively.

In a variant, no new APS type is created, the type of "ALF_APS" used in the VVC standard for ALF parameters is still used for high-res ALF, but the regular ALF uses some values for aps_id (aps_adaptation_parameter_set_id) whereas high-res ALF may use other values.

TABLE 1 example of APS modified syntax to support high-res ALF.

| | Descriptor |
|---|---|
| adaptation_parameter_set_rbsp( ) { | |
|   aps_params_type | u(3) |
|   aps_adaptation_parameter_set_id | u(5) |
|   aps_chroma_present_flag | u(1) |
|   if( aps_params_type = = ALF_APS ) | |
|     alf_data( ) | |
|   else if( aps_params_type = = ALF_RPR_APS ) | |
|     alf_data_rpr( ) | |
|   else if( aps_params_type = = LMCS_APS ) | |
|     lmcs_data( ) | |
|   else if( aps_params_type = = SCALING_APS ) | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

TABLE 2 example of aps_param_type names

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |
| 3 | ALF_RPR_APS | High-res ALF parameters |

In SPS, an additional syntax element sps_alf_rpr_enabled_flag is added (as illustrated in Table 3 below), indicating whether high-res ALF is enabled at the sequence level when a picture is coded using RPR. In a variant, a syntax element sps_ccalf_rpr_enabled_flag is also added to signal whether CC_ALF is enabled on high-res picture when a picture is coded using RPR, as explained below in relation with FIG. 14-16.

TABLE 3 example of SPS modified syntax to support high-res ALF.

| | Descriptor |
|---|---|
| Seq_parameter_set_rbsp( ) { | |
|   ... | |
|   sps_alf_enabled_flag | u(1) |
|   if( sps_alf_enabled_flag && sps_chroma_format_idc != 0 ) | |
|     sps_ccalf_enabled_flag | u(1) |
|   if ( sps_ref_pic_resampling_enabled_flag ) { | |
|     sps_alf_rpr_enabled_flag | u(1) |
|     if( sps_alf_rpr_enabled_flag && sps_chroma_format_idc != 0 ) | |
|       sps_ccalf_rpr_enabled_flag | u(1) |
|   } | |
|   ... | |
| } | |

Similarly to SPS, in slice or picture headers for Alf_ph_param, and in CTU header for Alf_ctu_param, additional syntax elements may be added to code high-res ALF parameters.

HLS Compatible with VVC

In another embodiment, one defines an HLS compatible with current VVC for signaling and coding the new APS. The use of new APS type "ALF_RPR_APS" has the advantage of being compatible with VVC since it will be discarded by a regular VVC decoder. In a variant, additionally to Alf_aps_param, the APS may include some Alf_ph_param or Alf_ctu_param parameters.

In another variant, if APS type "ALF_APS" is re-used for high-res ALF but with different values of aps_id, a regular VVC decoder will not use the APS with aps_id corresponding to high-res ALF because this aps_id is not referred by the Alf_ph_param, nor the Alf_ctu_param parameters (such as by sh_alf_aps_id_luma and sh_alf_aps_id_chroma syntax element indicating the aps_id to use for the block).

In another variant, one can also design a dedicated new SEI NAL unit tag (SEI_RPR_ALF) that carries Alf_ph_param and Alf_ctu_param (and Alf_aps_param if not in ALF_RPR_APS or ALF_APS). It could group the corresponding ALF parameters for the associated picture or a list of ALF parameters for several pictures referenced with the picture POC. This SEI will be discarded by a regular VVC decoder.

In some variants, these APS and SEI may be grouped into a SEI-nested message or in one single SEI.

The table 4 below depicts an example of syntax of SEI to support high-res ALF for RPR coded picture and containing some of Alf_ph_param and Alf_ctu_param and some additional useful parameters. In this example, the SEI contains information related to several pictures but in a variant, it may contain information for one picture only. Other examples can be derived by re-arranging, removing or adding some parameters.

TABLE 4 example of SEI to support high-res ALF.

| | | Descriptor |
|---|---|---|
| | alf_rpr_parameters( payloadSize ) { | |
| |   alf_rpr_enabled_flag | u(1) |
| |   ccalf_rpr_enabled_flag | u(1) |
| |   log2_ctu_size_minus5 | u(2) |
| |   nb_rpr_ctu_x_minus1 | ue(v) |
| |   nb_rpr_ctu_y_minus1 | ue(v) |
| |   pocBase | u(v) |
| |   num_alf_rpr_param_minus1 | u(v) |
| |   for( h = 0; h <= num_alf_rpr_param_minus1; h++ ) { | u(1) |
| |     delta_poc[h] | se(v) |
| |     if ( alf_rpr_enabled_flag ) { | |
| Alf_ph_param |       sh_alf_enabled_flag[h] | u(1) |
| |       if( sh_alf_enabled_flag[h] ) { | |
| |         sh_num_alf_aps_ids_luma[h] | u(3) |
| |         for( i = 0; i < sh_num_alf_aps_ids_luma[h]; i++ ) | |
| |           sh_alf_aps_id_luma[ h ][ i ] | u(3) |
| |         if( sps_chroma_format_idc != 0 ) { | |
| |           sh_alf_cb_enabled_flag[h] | u(1) |
| |           sh_alf_cr_enabled_flag[h] | u(1) |
| |         } | |
| |         if( sh_alf_cb_enabled_flag[h] \|\| sh_alf_cr_enabled_flag[h] ) | |
| |           sh_alf_aps_id_chroma[h] | u(3) |
| |         if( ccalf_rpr_enabled_flag ) { | |
| |           sh_alf_cc_cb_enabled_flag[h] | u(1) |
| |           if( sh_alf_cc_cb_enabled_flag[h] ) | |
| |             sh_alf_cc_cb_aps_id[h] | u(3) |
| |           sh_alf_cc_cr_enabled_flag[h] | u(1) |
| |           if( sh_alf_cc_cr_enabled_flag[h] ) | |
| |             sh_alf_cc_cr_aps_id[h] | u(3) |
| |         } | |
| |       } | |
| |     } | |
| |   } | |
| |   for( CtbAddrY = 0; CtbAddrY <= nb_rpr_ctu_y_minus1; CtbAddrY ++ ){ | |
| |     for( CtbAddrX = 0; CtbAddrX <= nb_rpr_ctu_x_minus1; CtbAddrX ++ ) { | |
| Alf_ctu_param |       if( sh_alf_enabled_flag ){ | |
| |         alf_ctb_flag[h][ 0 ][ CtbAddrX ][ CtbAddrY ] | ae(v) |
| |         if( alf_ctb_flag[h][ 0 ][ CtbAddrX ][ CtbAddrY ] ) { | |
| |           if( sh_num_alf_aps_ids_luma[h] > 0 ) | |
| |             alf_use_aps_flag[h] | ae(v) |
| |           if( alf_use_aps_flag ) { | |
| |             if( sh_num_alf_aps_ids_luma[h] > 1 ) | |
| |               alf_luma_prev_filter_idx[h] | ae(v) |
| |           } else | |
| |             alf_luma_fixed_filter_idx[h] | ae(v) |
| |         } | |
| |         if( sh_alf_cb_enabled_flag[h] ) { | |
| |           alf_ctb_flag[h][ 1 ][ CtbAddrX ][ CtbAddrY ] | ae(v) |
| |           if( alf_ctb_flag[h]   [ 1 ][ CtbAddrX ][ CtbAddrY ] | |
| |             && alf_chroma_num_alt_filters_minus1 > 0 | |
| ) | | |

TABLE 4-continued example of SEI to support high-res ALF.

|  | Descriptor |
|---|---|
| alf_ctb_filter_alt_idx[h][ 0 ][ CtbAddrX ][ CtbAddrY ]<br>}<br>if( sh_alf_cr_enabled_flag[h] ) {<br>  alf_ctb_flag[h][ 2 ][ CtbAddrX ][ CtbAddrY ] | ae(v)<br><br><br>ae(v) |
| if(   alf_ctb_flag[h][ 2 ][ CtbAddrX ][ CtbAddrY ]<br>    && alf_chroma_num_alt_filters_minus1 > 0<br>)<br>alf_ctb_filter_alt_idx[h][ 1 ][ CtbAddrX ][ CtbAddrY ]<br>}<br>}<br>if( sh_alf_cc_cb_enabled_flag[h] )<br>  alf_ctb_cc_cb_idc[h][ CtbAddrX ][ CtbAddrY ]<br>if( sh_alf_cc_cr_enabled_flag )<br>  alf_ctb_cc_cr_idc[h][ CtbAddrX ][ CtbAddrY ]<br>}<br>} | <br><br><br>ae(v)<br><br><br><br>ae(v)<br><br>ae(v) |

In this example, the coding of the Alf_ctu_param uses entropy coding (CABAC). In a variant, they use variable length coding (VLC) coding.

The syntax elements XXXX[h] are associated with the picture with index h and poc[h].

The semantics of the syntax elements are the following:
alf_rpr_enabled_flag and ccalf_rpr_enabled_flag have the same semantics as sps_alf_enabled_flag and sps_ccalf_enabled_flag in VVC specification respectively, applied to high-res ALF.

log 2_ctu_size_minus5 plus 5 allows deriving the ALF block size alfCtbSizeY after up-sampling. The value of log 2_ctu_size_minus5 shall be in the range of 0 to 2, inclusive. The variables alfCtbLog2SizeY and alfCtbSizeY are derived as follows:

$$alfCtbLog2SizeY = \log2\_ctu\_size\_minus5 + 5$$

$$alfCtbSizeY = 1 << alfCtbLog2SizeY$$

nb_rpr_ctu_x_minus1 plus 1 and nb_rpr_ctu_y_minus1 plus 1 specifies the number of ALF block size horizontally and vertically respectively, after up-sampling.

num_alf_rpr_param_minus1 plus 1 specifies the number of picture-based ALF parameters contained in the SEI.

pocBase and delta_poc[h] allows deriving the poc[h] of the picture associated with the index h as follows:
poc[h]=pocBase+delta_poc[h]

The other syntax elements XXXX[h] use the same semantics as corresponding symbol XXXX in the VVC specification, but apply to the high-res ALF process proposed herein when a picture is coded using RPR.

According to another embodiment, one can exploit the VVC scalable syntax to emulate post-filtering of up-scaled pictures. In this embodiment, the enhanced layer (EL) has SPS and PPS containing maximum picture size and current picture size respectively can be equal to the high-res pictures. When the base layer (BL) picture is coded at low-res, the EL decoding of a current picture uses an implicit up-sampling via the RPR process during the motion compensation stage, when the CU are coded in inter prediction and use the inter-layer reference picture (ILRP) as unidirectional reference picture with motion equal to zero, the inter-layer reference picture being the reconstructed low-res picture from the base layer.

Consequently, in the particular case where all the CUs are predicted with ILRP and have residuals equal to zero (ex: CU coded in skip mode, cu_skip_flag=1), the reconstruction of the CU in the EL consists in implicit RPR up-sampling plus the post-filtering process. Then if the ALF parameters in the EL have been determined as explained in any one of the embodiments described above, then ALF is applied on the up-sampled reconstructed low-res (base layer pictures).

However, one drawback of this approach of re-using existing VVC syntax, is that a decoding device should instantiate two decoders (one decoder per layers) and associated resources (memory, etc. . . . ) while, only the resolution of the enhancement layer is desirable for display. In addition, the decoding only need to run up-sampling (motion compensation with RPR) and post-filtering stages actually.

In an embodiment, these drawbacks could be leveraged by high level syntax signaling some limitations of the coding modes used in the EL coded layer video sequence (CLVS), such as that all the CUs are coded with a subset of coding mode (ex: inter skip-mode). The signaling may be carried out at slice or picture level (ex: in picture header, slice header) or in a specific NAL unit (ex: SEI, VPS) indicating that next picture (picture unit, PU) or group of pictures or all the pictures of the layer are coded in one particular coding mode (ex: "skip mode"), but the post-filtering may be enabled. Other restrictions may apply with this signaling such as that DBF (deblocking filter) or SAO are disabled. In a variant, the useless syntax elements of the SPS and PPS are not present (ex: other coding mode parameters which are not used).

In the above, various methods and syntaxes, for example, exploiting of the VVC syntax (related to scalability) to emulate post-filtering of up-scaled pictures, are described at the picture level. More generally, the proposed signaling can be applied at a region level, where a region is composed of one or more blocks, for example, one or more sub-pictures, tiles, and slices.

In addition, the various methods and syntaxes are described above for the ALF filter. More generally, these methods and syntaxes can be applied to other post-filters, such as the SAO filter and de-blocking filter, for example, including additional SAO parameters in order to apply SAO filtering on re-scaled pictures.

FIG. 2 illustrates an encoder 200 wherein any one of the embodiments described above is implemented. Variations of this encoder 200 are contemplated, but the encoder 200 is described below for purposes of clarity without describing all expected variations.

In some embodiments, FIG. 2 also illustrate an encoder in which improvements are made to the HEVC standard or an encoder employing technologies similar to HEVC, such as a VVC (Versatile 20) Video Coding) encoder under development by JVET (Joint Video Exploration Team).

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components).

According to an embodiment, pre-encoding processing (201) includes down-sampling the input picture for encoding, such as in the RPR process of the VVC standard.

Metadata can be associated with the pre-processing, and attached to the bitstream (290). Such metadata can include parameters for post-processing, such as the high-res ALF parameters described above, for instance in an SEI or APS Nal Unit. 30

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods. Prediction residuals are calculated, for example, by subtracting (210) the predicted block from the original image block.

The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) or ALF (Adaptive Loop filter) filtering to reduce encoding artifacts. The filtered image is stored at a reference picture buffer (280).

In a variant, when the input picture has been down-sampled before encoding, the encoder (200) comprises an up-sampling of the reconstructed image as described above in an embodiment. In-loop filtering, such as deblocking, SAO (or ALF) is applied on down-sampled reconstructed pictures, ALF may be applied to the up-sampled picture and stored in the DPB possibly.

In another variant, when the input picture has been down-sampled before encoding, adaptive filtering is performed on the down-sampled version of the reconstructed picture which is then stored in the DPB in the low-res version.

FIG. 3 illustrates a block diagram of a video decoder 300 wherein any one of the embodiments described above is implemented. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200.

According to an embodiment, the bitstream comprises metadata associated with pre-processing performed on the pictures before encoding. Such metadata includes (301) parameters for post-processing, such as the high-res ALF parameters described above.

The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201), or an up-sampling of the decoded picture. The post-decoding processing can use metadata derived in the pre-encoding processing and signaled in the bitstream (301).

In a variant, when the decoded picture is obtained from an encoding of an input picture that has been down-sampled before encoding, the decoder (300) comprises an up-sampling of the decoded image as described above in an embodiment. In-loop filtering, such as deblocking, SAO or ALF, is then applied to the down-sampled and/or up-sampled picture and stored in the DPB possibly.

In another variant, when the decoded picture is obtained from an encoding of an input picture that has been down-sampled before encoding, adaptive filtering is performed on the down-sampled version of the reconstructed picture which is then stored in the DPB in the low-res version possibly.

Figure 18:
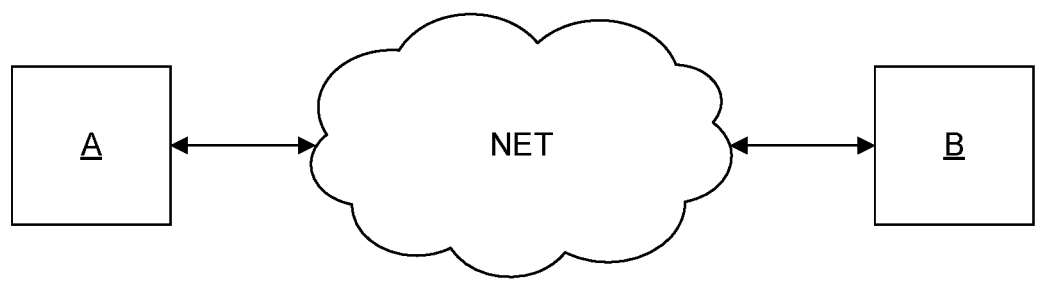
FIG. 18 shows two remote devices communicating over a communication network in accordance with an example of the present principles.

In an embodiment, illustrated in FIG. 18, in a transmission context between two remote devices A and B over a communication network NET, the device A comprises a processor in relation with memory RAM and ROM which are configured to implement a method for encoding a video as described with FIG. 1-17 and the device B comprises a processor in relation with memory RAM and ROM which are configured to implement a method for decoding a video as described in relation with FIGS. 1-17.

In accordance with an example, the network is a broadcast network, adapted to broadcast/transmit encoded data representative of a video from device A to decoding devices including the device B.

A signal, intended to be transmitted by the device A, carries at least one bitstream comprising coded data representative of a video. The bitstream may be generated from any embodiments of the present principles.

Figure 19:
FIG. 19 shows the syntax of a signal in accordance with an example of the present principles.

FIG. 19 shows an example of the syntax of such a signal transmitted over a packet-based transmission protocol. Each transmitted packet P comprises a header H and a payload PAYLOAD. In some embodiments, the payload PAYLOAD may comprise coded video data encoded according to any one of the embodiments described above. In some embodiments, the signal comprises the up-sampling filter coefficients as determined above.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, decode up-sampling filter coefficients, up-sampling a decoded picture.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, down-sampling an input picture, determining up-sampling filter coefficients, up-sampling a decoded picture.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

a. SDP (session description protocol), a format for describing multimedia communication sessions for the purposes of session announcement and session invitation, for example as described in RFCs and used in conjunction with RTP (Real-time Transport Protocol) transmission.

b. DASH MPD (Media Presentation Description) Descriptors, for example as used in DASH and transmitted over HTTP, a Descriptor is associated to a Representation or collection of Representations to provide additional characteristic to the content Representation.

c. RTP header extensions, for example as used during RTP streaming.

d. ISO Base Media File Format, for example as used in OMAF and using boxes which are object-oriented building blocks defined by a unique type identifier and length also known as 'atoms' in some specifications.

e. HLS (HTTP live Streaming) manifest transmitted over HTTP. A manifest can be associated, for example, to a version or collection of versions of a content to provide characteristics of the version or collection of versions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Some embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals one or more syntax elements relative to adaptive filtering of a reconstructed picture. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Encoding/decoding a video wherein the original picture/region can be encoded at a high-resolution, or a lower-resolution, according to any of the embodiments described.

Reconstructing a picture/region from a downscaled decoded picture/region, according to any of the embodiments described.

A bitstream or signal that includes one or more of the described syntax elements, or variations thereof.

A bitstream or signal that includes syntax conveying information generated according to any of the embodiments described.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs decoding of a video according to any of the embodiments described.

A TV, set-top box, cell phone, tablet, or other electronic device that performs decoding of a video according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs decoding of a video according to any of the embodiments described.

A TV, set-top box, cell phone, tablet, or other electronic device that receives (e.g. using an antenna) a signal over the air that includes an encoded image, and performs decoding of a video according to any of the embodiments described.

The invention claimed is:

1. A method comprising:
decoding a picture at a first resolution;
classifying samples of the decoded picture at the first resolution;
applying an adaptive loop filter to samples of at least one component of the decoded picture at the first resolution, providing a filtered decoded picture at the first resolution, wherein for at least one first-size block of the at least one component of the decoded picture at the first resolution, a first index signaled at a block level indicates a set of coefficients to be used for the at least one first-size block and wherein for each sample of the at least one first-size block, the adaptive loop filter is selected from the set of coefficients indicated by the first index based on the classifying;
up-sampling the filtered decoded picture at the first resolution to a second resolution, the first resolution being lower than the second resolution; and
applying an adaptive filter to samples of at least one component of the up-sampled filtered decoded picture, wherein, for at least one second-size block of the at least one component of the up-sampled filtered decoded picture, a second index indicates a set of adaptive filters to be used for the at least one second-size block, and wherein for each sample of the at least one second-size block, the adaptive filter is selected from the set of adaptive filters indicated by the second index according to a classification.

2. An apparatus, comprising one or more processors, wherein said one or more processors are configured for:
decoding a picture at a first resolution;
classifying samples of the decoded picture at the first resolution;
applying an adaptive loop filter to samples of at least one component of the decoded picture at the first resolution, providing a filtered decoded picture at the first resolution, wherein for at least one first-size block of the at least one component of the decoded picture at the first resolution, a first index signaled at a block level indicates a set of coefficients to be used for the at least one first-size block and wherein for each sample of the at least one first-size block, the adaptive loop filter is selected from the set of coefficients indicated by the first index based on the classifying;
up-sampling the filtered decoded picture at the first resolution to a second resolution, the first resolution being lower than the second resolution; and
applying an adaptive filter to samples of at least one component of the up-sampled filtered decoded picture, wherein, for at least one second-size block of the at least one component of the up-sampled filtered decoded picture, a second index indicates a set of adaptive filters to be used for the at least one second-size block, and wherein for each sample of the at least one second-size block, the adaptive filter is selected from the set of adaptive filters indicated by the second index according to a classification.

3. The method of claim 1, wherein coefficients of the adaptive filter are determined at an encoder based on the picture at the second resolution.

4. The method of claim 1, wherein the classification used to select the adaptive filter in the set of adaptive filters indicated by the second index is a classification performed on the filtered decoded picture at the first resolution.

5. The method of claim 1, wherein:
enabling of an application of the adaptive loop filter to the decoded picture at the first resolution disables an application of the adaptive filter to the up-sampled decoded picture at the second resolution; or
enabling the application of the adaptive filter to the up-sampled decoded picture at the second resolution disables the application of the adaptive loop filter to the decoded picture at the first resolution.

6. The method of claim 1, further comprising:
decoding an indicator indicating whether the filtered up-sampled decoded picture at the second resolution is stored in a decoded picture buffer.

7. The method of claim 1, wherein applying the adaptive filter to the up-sampled decoded picture at the second resolution is a cross-component filter applied on chrominance components.

8. The method of claim 1, wherein coefficients of the adaptive loop filter are determined based on samples of the picture at the second resolution that correspond to samples of the picture at the first resolution.

9. A non-transitory computer readable storage medium having stored thereon instructions for causing one or more processors to perform the method of claim 1.

10. The apparatus of claim 2, further comprising:
at least one of (i) an antenna configured to receive a signal, the signal including data representative of a video, (ii) a band limiter configured to limit the received signal to a band of frequencies that includes the data representative of video, or (iii) a display configured to display the video.

11. The apparatus of claim 10, comprising a television (TV), a cell phone, a tablet or a set top box.

12. The method of claim 1, wherein the classification used to select the adaptive filter in the set of adaptive filters indicated by the second index is the classification performed on the decoded picture at the first resolution.

13. The apparatus of claim 2, wherein the classification used to select the adaptive filter in the set of adaptive filters indicated by the second index is the classification performed on the decoded picture at the first resolution.

14. The apparatus of claim 2, wherein coefficients of the adaptive filter are determined at an encoder based on the picture at the second resolution.

15. The apparatus of claim 2, wherein the classification used to select the adaptive filter in the set of adaptive filters indicated by the second index is a classification performed on the filtered decoded picture at the first resolution.

16. The apparatus of claim 2, wherein:
enabling of an application of the adaptive loop filter to the decoded picture at the first resolution disables an application of the adaptive filter to the up-sampled decoded picture at the second resolution; or
enabling the application of the adaptive filter to the up-sampled decoded picture at the second resolution disables the application of the adaptive loop filter to the decoded picture at the first resolution.

17. The apparatus of claim 2, wherein the one or more processors are further configured for decoding an indicator indicating whether the filtered up-sampled decoded picture at the second resolution is stored in a decoded picture buffer.

18. The apparatus of claim 2, wherein applying the adaptive filter to the up-sampled decoded picture at the second resolution is a cross-component filter applied on chrominance components.

19. The apparatus of claim 2, wherein coefficients of the adaptive loop filter are determined based on samples of the picture at the second resolution that correspond to samples of the picture at the first resolution.

* * * * *